United States Patent

Takeda et al.

[11] Patent Number: 6,078,405
[45] Date of Patent: Jun. 20, 2000

[54] IMAGE PROCESSING DEVICE

[75] Inventors: Yuuki Takeda, Chiba; Hideaki Yamada, Ichihara, both of Japan

[73] Assignee: Sharp Kabushiki Kaisha, Osaka, Japan

[21] Appl. No.: 08/931,703

[22] Filed: Sep. 16, 1997

[30] Foreign Application Priority Data

Sep. 24, 1996 [JP] Japan .................................. 8-251120

[51] Int. Cl.$^7$ .................................................. H04N 1/40
[52] U.S. Cl. ............................................................ 358/462
[58] Field of Search .................................... 358/456, 455, 358/458, 459, 462, 466, 429; 382/237

[56] References Cited

U.S. PATENT DOCUMENTS

| | | | |
|---|---|---|---|
| 4,668,995 | 5/1987 | Chen et al. | 358/282 |
| 5,486,927 | 1/1996 | Koizumi | 358/298 |
| 5,687,252 | 11/1997 | Kanno et al. | 382/176 |
| 5,787,195 | 7/1998 | Tsujimoto | 382/176 |
| 5,798,846 | 8/1998 | Tretter | 358/456 |

FOREIGN PATENT DOCUMENTS 6-83365  12/1984  Japan ............................ H04N 1/00

Primary Examiner—Jerome Grant

Attorney, Agent, or Firm—Dike, Bronstein, Roberts & Cushman, LLP; David G. Conlin

[57] ABSTRACT

The present invention is directed to an image processing device that can process a halftone dot image without producing moire therein. An image processing device according to the present invention comprises an image memory for storing multi-gradational image data, an area-deciding portion for deciding an area of pixels PIX (x, y) of a multi-gradational image stored in the memory and outputting decision signal SEL=0 when the pixel is a character-area pixel or SEL=1 when the pixel is a halftone area, a binarizing portion for character for binarizing a character image pixel PIX (x, y) of the multi-gradational image data stored in the memory and outputting a binarized image data L, a binarizing portion for photographic image for binarizing a halftone image pixel PIX (x, y) of the multi-gradational image data stored in the memory and outputting a binarized image data P, an output selecting portion for selectably outputting binarized image data B which is a binarized image output L from the character-image data from the binarizing portion for character when the output SEL of the area-deciding portion is 1 or a binary image output P from the binarizing portion for photographic image when the output SEL is 0, and a memory for storing binarized image data outputted from the output selecting portion.

5 Claims, 4 Drawing Sheets

IMAGE PROCESSING DEVICE

BACKGROUND OF THE INVENTION

In a usual facsimile transmission, a sending terminal reads an original image as multivalued image data by an incorporated scanner, converts the data into binary image data and sends the converted binary data.

The receiving terminal outputs the received binary image data to print the data on recording paper.

The conventional image processing device converts multi-valued image data into binary image data in the following way:

First, the original image is divided to character image areas and halftone image areas.

Means of discriminating between the character image areas and the halftone image areas are usually called as area deciding means.

Area decision is made firstly by examining whether density of an objective pixel to be examined is within a range between a specified black threshold and a specified white threshold and secondly by examining whether a difference of the density of the objective pixel from an average optical density of four pixels existing in upper, lower, left and right of the objective pixel is equal or smaller than a specified threshold. The objective pixel is decided as a halftone area if it satisfies both conditions as the result of the examinations. The objective pixel is decided as a character area if it does not satisfy both conditions at a time as the result of the examinations.

The halftone pixel thus decided is binarized by dithering with error diffusion method. A pixel judged as a character area pixel is binarized by using a specified threshold value, omitting dithering process that may impair character information.

A halftone image represented by halftone dots of a larger size than a certain value of roughness cannot be processed without causing moire fringes by a conventional image processing device. Moire fringes may be produced because the conventional image processing device may periodically mistake an image represented by halftone dots for a character image.

The conventional image processing device decides an area of each of the pixels read by scanning the original image by referring to four pixels existing just upper, lower, left and right from each objective pixel. In this case, each objective pixel is judged to be of a character area if a difference of its density from an average density of the referred pixels exceeds a certain threshold value.

In this halftone dot image, pixels at positions of a certain cycle are misjudged to be of a character area because the differential values of its density from an average density of the referred pixels cyclically exceed the threshold value. These misjudgments cause moire fringes in the image when reproduced.

SUMMARY OF THE INVENTION

The present invention relates to an image processing device and more particularly to an image processing device used for converting multivalued image data into binary image data in binary image data transmission system such as facsimile transmission.

The present invention is directed to an image processing device that properly decides pixels to be of a character area and is free from the above-mentioned problem of moire fringes.

To achieve the above-mentioned object, the present invention provides an image processing device which comprises area deciding means for discriminating between a character area and a halftone area (e.g., photographic image) by sequentially checking pixels of multi-gradational image data pixel by pixel, character-binarizing means for binarizing character image areas, photograph-binarizing means for binarizing a halftone image areas (e.g., photographic image areas) and output means for selectably outputting binarized data for character or binarized data for halftone according to the area decision results, wherein the area deciding means for discriminating between a character area and a halftone area (e.g., photographic image area) by checking each pixel of multi-gradational image data is further provided with first temporary deciding means for temporarily deciding an objective pixel by referring to four pixels existing in above, below, left and right of the objective pixel, second temporary deciding means for temporarily deciding an objective pixel by referring to four pixels existing in above left, above right, below left and below right respectively of the objective pixel and deciding means for deciding all of pixels arranged on a line as a halftone area (e.g., photographic image area) in a case of the number of pixels temporarily decided as halftone (photographic image) area is equal to or larger than a specified threshold or for deciding all of pixels arranged on a line as a character area in a case of the number of the pixels temporarily decided as halftone area is less than the specified threshold.

This image processing device further includes a first memory for storing the multi-gradational image data or a second memory for storing the binarized data or both the memories.

In the above-mentioned image processing device, a multi-gradational image data is stored in the first memory from which the data is then subsequently read pixel by pixel and decided as character area pixels or halftone area (e.g., photographic image) pixels. Simultaneously, character pixels and halftone (e.g., photographic image) pixels are binarized respectively. The binarized data for character and the binarized data for halftone (e.g., photographic image) are selectably output pixel by pixel according to the above-mentioned area-deciding results. The binarized image data is stored in the second memory.

In the process of subsequently deciding the character or halftone (e.g., photographic image) area of the multi-gradational image data, each pixel is temporarily decided by reference to four neighboring pixels existing in just above, below, left and right thereof and temporarily decided by reference to four neighboring pixels existing in above left, above right, below left and below right thereof.

All pixels arranged on a line are then decided as a halftone area (e.g., photographic image) is equal to or lager than a specified threshold, otherwise these pixels are decided as a character area if the number of pixels temporarily decided as a halftone (e.g., photographic image) area is less than the specified threshold.

PREFERRED EMBODIMENTS OF THE INVENTION

Prior to explaining preferred embodiments of the present invention, an image processing device basic art on which the present invention stand, will be described below as references for the present invention.

In a usual facsimile transmission, a sending terminal reads an original image as multivalued image data by an incorporated scanner, converts the data into binary image data and sends the converted binary data.

The receiving terminal outputs the received binary image data to print the data on recording paper.

The conventional image processing device converts multi-valued image data into binary image data in the following way:

First, the original image is divided to character image areas and halftone image areas.

Means of discriminating between the character image areas and the halftone image areas are usually called as area deciding means.

Area decision is made firstly by examining whether density of an objective pixel to be examined is within a range between a specified black threshold and a specified white threshold and secondly by examining whether a difference of the density of the objective pixel from an average optical density of four pixels existing in upper, lower, left and right of the objective pixel is equal or smaller than a specified threshold. The objective pixel is decided as a halftone area if it satisfies both conditions as the result of the examinations. The objective pixel is decided as a character area if it does not satisfy both conditions at a time as the result of the examinations.

The halftone pixel thus decided is binarized by dithering with error diffusion method. A pixel judged as a character area pixel is binarized by using a specified threshold value, omitting dithering process that may impair character information.

A halftone image represented by halftone dots of a larger size than a certain value of roughness cannot be processed without causing moire fringes by a conventional image processing device. Moire fringes may be produced because the conventional image processing device may periodically mistake an image represented by halftone dots for a character image.

Figure 1:
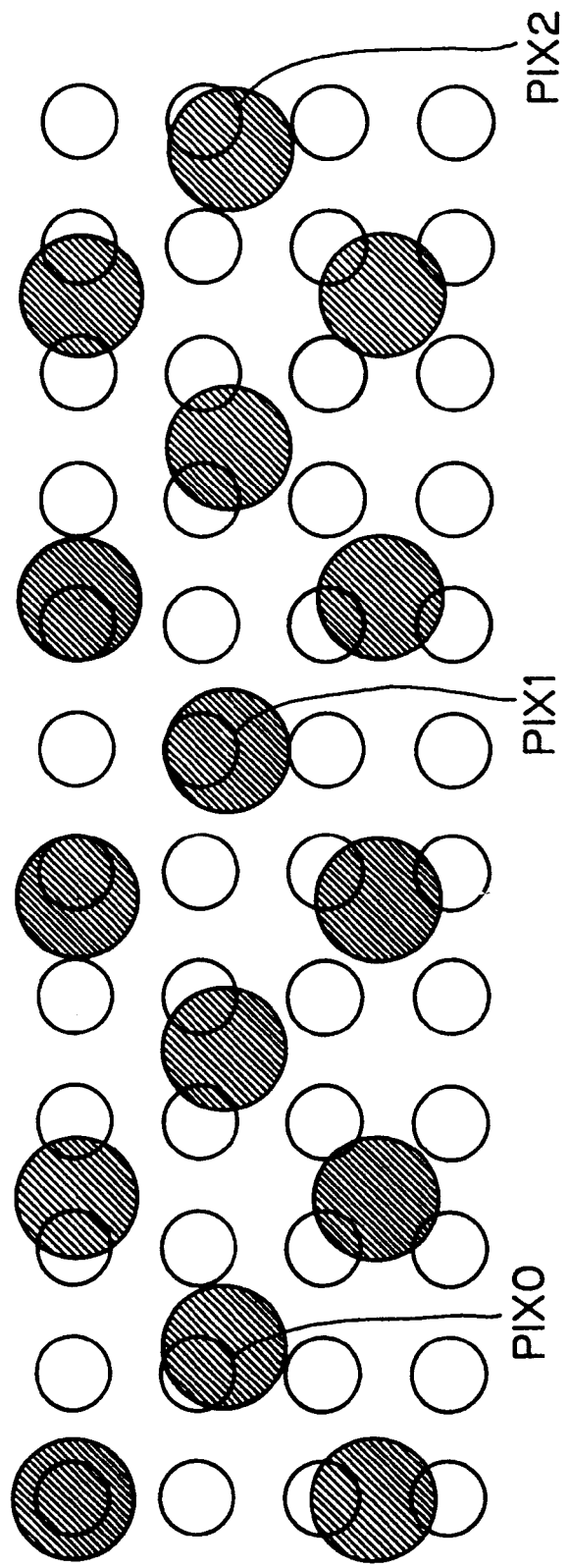
FIG. 1 is illustrative of a correlation between a dots (halftone) image and a scanner position in a conventional image processing.

FIG. 1 shows a relation between a dot image and positions readable by a scanner of a conventional video processing device to explain a reason for causing moire fringes.

In FIG. 1, white circles indicate points readable by the scanner and black circles (with hatching therein) indicate halftone dots composing the halftone dot image.

The conventional image processing device decides an area of each of the pixels read by scanning the original image shown in FIG. 1 by referring to four pixels existing just upper, lower, left and right from each objective pixel. In this case, each objective pixel is judged to be of a character area if a difference of its density from an average density of the referred pixels exceeds a certain threshold value.

In this halftone dot image of FIG. 1, pixels at positions of a certain cycle PIX0, PIX1 and PIX2 are misjudged to be of a character area because the differential values of its density from an average density of the referred pixels cyclically exceed the threshold value. These misjudgments cause moire fringes in the image when reproduced.

A preferred embodiment of the present invention will be described.

Figure 2:
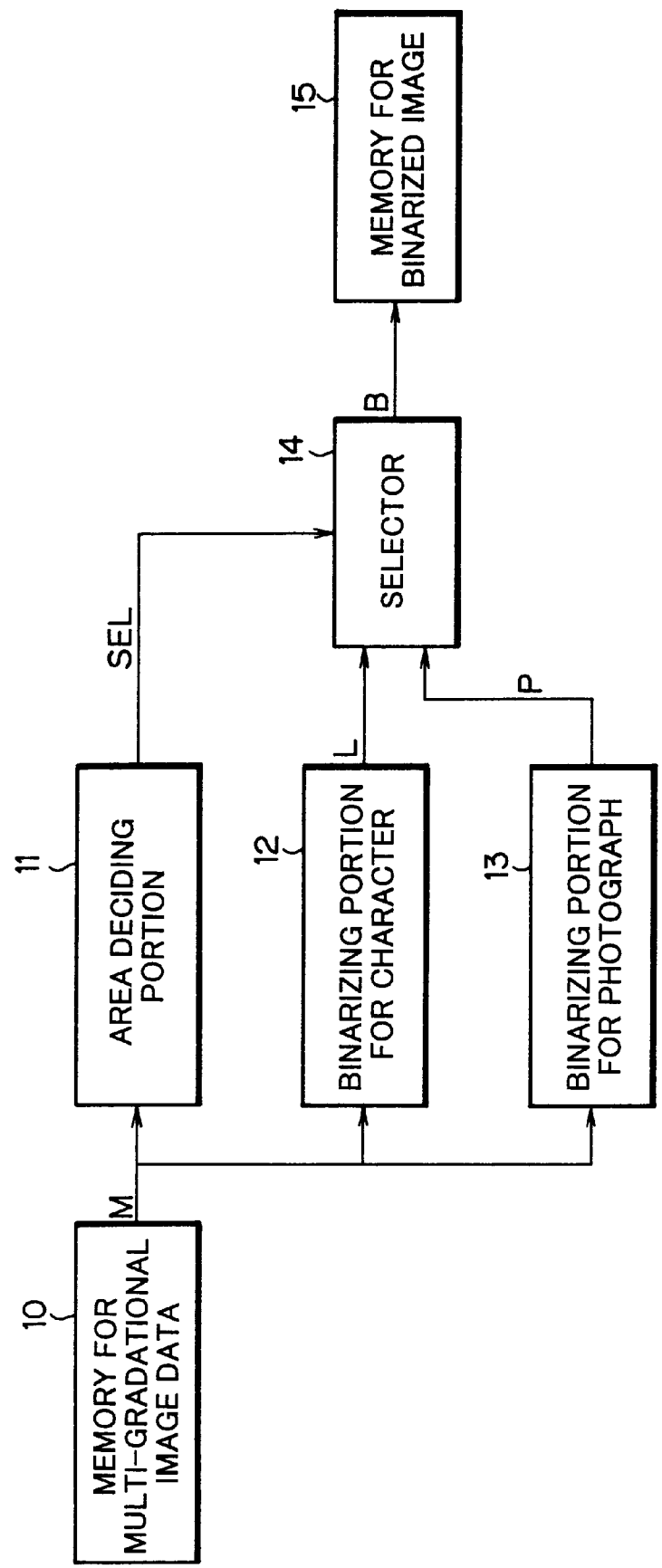
FIG. 2 is a block diagram showing the general construction of an image processing device according to the present invention.

FIG. 2 is a block diagram showing a general construction of an image processing device according to the present invention.

This image processing device comprises: a memory 10 for storing multi-gradational image data; an area deciding potion 11, connected to the memory 10, for deciding the area to which multi-gradational pixels PIX (x, y) stored in the memory 10 belong and outputting a signal of SEL=0 if a PIX (x, y) is of a character image area or a signal of SEL=1 if a PIX (x, y) is of a halftone image area;

a binarizing portion for character 12, connected to the memory 10, for character-binarizing the multi-gradational image data PIX (x, y) stored in the memory 10 and outputting binarized image data L;

a binarizing portion for photograph 13, connected to the memory 10, for halftone-image (e.g., photographic image) binarizing the multi-gradational image data PIX (x, y) stored in the memory 10 and outputting binarized image data P;

an output selecting portion (selector) 14, connected to the area deciding portion 11, the binarizing portion for character 12 and the binarizing portion for photograph 13, for selectably outputting a binarized image data L from the binarizing portion for character 12 when the area deciding portion 11 outputs SEL=0 or a binarized image data B to be changed over the binarized image data P from the binarizing portion for photograph 13 when the area deciding portion 11 outputs SEL=1; and a memory for binarized image 15, connected to the output selecting portion 14, for receiving and storing binarized image data B outputted from the output selecting portion 14.

Figure 3:
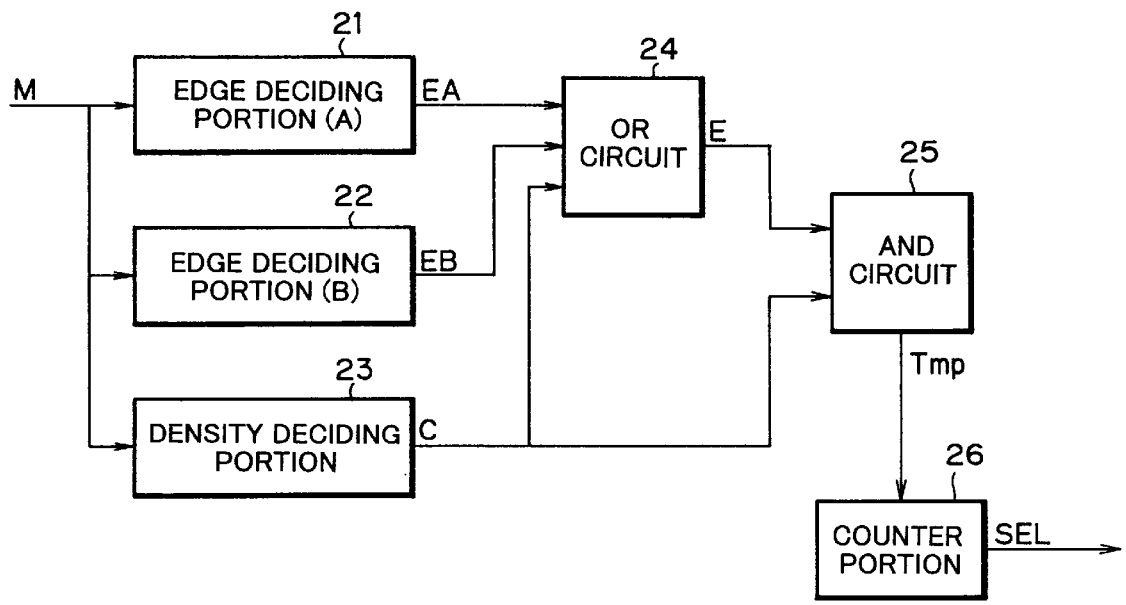
FIG. 3 is a block diagram showing a detail of an area deciding portion of an image processing device according to the present invention.

FIG. 3 is a block diagram for explaining the construction of the area deciding portion 11 shown in FIG. 2.

This area deciding portion 11 is provided with an edge deciding portion (A) 21 that reads multi-gradational image data, examines an objective pixel at PIX (0, 0) by reference to 4 pixels existing at PIX (1, 0), PIX (–1, 0), PIX (0, 1) and PIX (0, –1) shown in FIG. 5 (hereinafter described) whether these pixels satisfy a specified condition and outputs a decision signal EA=1 when the condition is satisfied or a decision signal EA=0 when the condition is not satisfied.

The area deciding portion 11 is also provided with an edge deciding portion (B) 22 that examines an objective pixel at PIX (0, 0) by reference to 4 pixels existing at PIX (–1, –1), PIX (1, –1), PIX (–1, 1) and PIX (1, 1) shown in FIG. 6 (hereinafter described) whether these pixels satisfy a specified condition and outputs a decision signal EB=1 when the condition is satisfied or a decision signal EB=0 when the condition is not satisfied.

The area deciding portion 11 is further provided with a density deciding portion 23 that examines whether the objective pixel satisfies a specified condition and outputs a decision signal C=1 when the condition is satisfied or a decision signal C=0 when the condition is not satisfied.

This area decision portion 11 is still further provided with an OR circuit 24 that is connected to the edge deciding portion (A) 22, the edge deciding portion (B) 23 and the density deciding portion 23 and presents an output E corresponding to OR with inputs EA, EB and C, an AND circuit 25 that presents an output Tmp corresponding to AND with inputs E and C and a counter circuit 26 that is connected to the AND circuit and outputs a result SEL of an area decision per line.

The density deciding portion 23 decides whether the following conditional equation (1) is satisfied or not. In the equation (1), Q (0, 0) designates the density of an objective pixel PIX (0, 0) to be decided as character image area or halftone image area. TB designates a threshold for discriminating the black density level and TW designates a threshold value for discriminating the white density level.

$$TB \leq Q(0, 0) \leq TW \quad (1)$$

Figure 4:
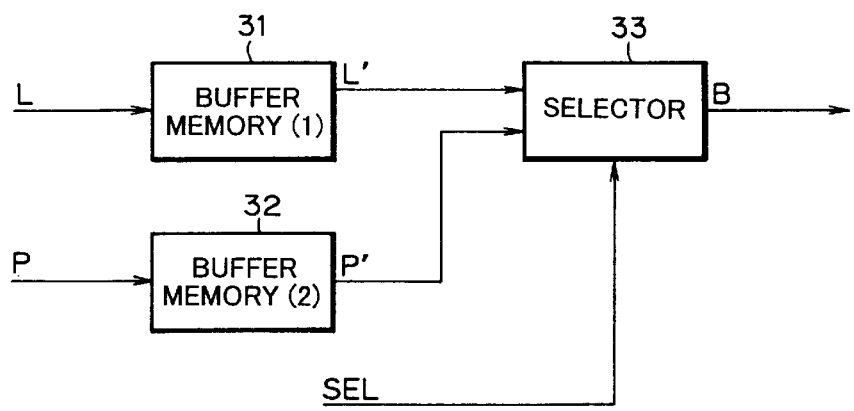
FIG. 4 is a block diagram showing a detail of an output selecting portion of the area deciding portion shown in FIG. 3.

FIG. 4 is a block diagram for explaining the output selecting portion (selector) 14 shown in FIG. 2.

This output selecting portion 14 is composed of a buffer memory (1) 31, a buffer memory (2) 32 and a selector 33. The output selector portion 14 receives an output L from the binarizing portion for character 12 as binarized image data per line and stores the received data in the buffer memory (1) 31.

The output selecting portion 14 also receives an output P from the binarizing portion for photograph 13 as binary image data per line and stores the received data in the buffer memory (2) 32. An output L' from the buffer memory (1) 31, an output P' from the buffer memory (2) 32 and an output SEL from the area deciding portion 11 are input to the selector 33 that in turn outputs a binarized image output B (either one of two inputs L' and P') selected by the signal SEL.

Figure 5:
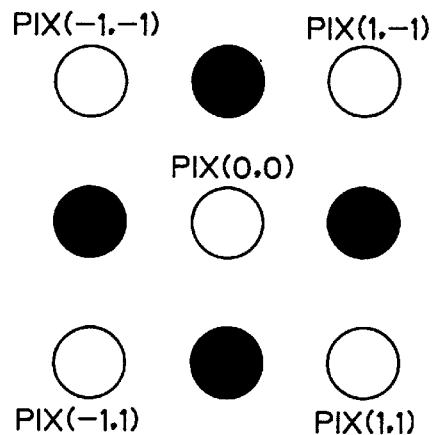
FIG. 5 is a view for explaining the function of an edge deciding portion (A) of an image processing device according to the present invention.

FIG. 5 is a view for explaining the function of the edge deciding portion (A) 21 shown in FIG. 3.

The edge deciding portion (A) 21 examines an objective pixel PIX (0, 0) by reference to 4 pixels existing at PIX (-1, 0), PIX (1, 0), PIX (0, -1,) and PIX (0, 1) according to Equation (2) (to be described below) and outputs a decision signal EA=1 when said equation is satisfied or a decision signal EA=0 when the equation is not satisfied. The density values of pixels PIX (0, 0), PIX (-1, 0), PIX (1, 0), PIX (0, 1) and PIX (0, -1) are expressed by Q (0, 0), Q (-1, 0), Q (1,0), Q (0, 1) and Q (0, -1) respectively.

Figure 6:
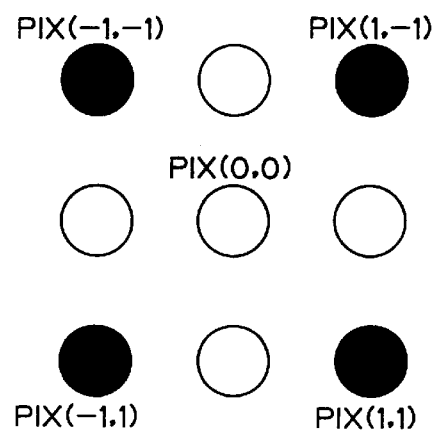
FIG. 6 is a view for explaining the function of an edge deciding portion (B) of an image processing device according to the present invention.

FIG. 6 is a view for explaining functions of the edge deciding portion (B) 22 shown in FIG. 3. The edge deciding portion (B) 22 examines an objective pixel PIX (0, 0) by reference to 4 pixels existing at PIX (1, 1), PIX (-1, 1), PIX (1, -1) and PIX (-1, -1) according to Equation (2) (to be described below) and outputs a decision signal EB=1 when said equation is satisfied or a decision signal EB=0 when the equation is not satisfied. The optical density values of pixels PIX (0, 0), PIX (1, 1), PIX (-1, 1), PIX (1, -1) and PIX (-1, -1) are expressed by Q (0, 0) , Q (1, 1) , Q (-1, 1) , Q (1, -1) and Q (-1, -1) respectively.

Q max indicates maximal one of the density values Q (-1, 0), Q (1,0), Q (0, 1), Q (0, -1) or Q (-1, -1), Q (1, -1), Q (-1, 1), Q (1, 1) while Q min indicates minimal one of the density values Q (-1, 0), Q (1,0), Q (0, 1), Q (0, -1) or Q (-1, -1), Q (1, -1) , Q (-1, 1), Q (1, 1). TE is a threshold value for deciding any objective pixel to be of an edge.

$$Q \text{ max} - Q \text{ min} \leq TE \quad (2)$$

Figure 7:
FIG. 7 is a view for explaining the decision of area by unit line in an image processing device according to the present invention.

FIG. 7 depicts the function of the counter circuit 26 according to the present invention. A signal Tmp that is an output of the AND circuit 25 for representing a temporary area-decision result is inputted to the counter circuit 26. The result is assumed such that pixels in one line have been decided, as shown in FIG. 7, to be of character image area expressed by black circles and of halftone image areas expressed by white circles. All the pixels in the line are finally decided to be of a halftone image such as a photographic image if the number of the black circles therein is equal or larger than a certain threshold value.

According to the above-mentioned image processing device, each of the pixels in a multi-gradational image read by a scanner is decided to be of a character image area or a halftone image (e.g., photographic image) area by reference to four neighboring pixels existing in above, below, left and right of the objective pixel and by reference to four pixels existing in above left, above right, below left and below right of the objective pixel and then each line of pixels is finally decided to be of a halftone (photographic image) image area or a character image area according to the larger number of pixels temporarily judged to be of halftone area or character area. The above-mentioned two-stage area-deciding operations eliminate the possibility of occurrence of moires due to periodical reading (200 dpi) by a scanner and moires in newspaper (133 lines/inch) and assure the readability of characters. The image processing device according to the present invention decides areas of pixels composing a multi-gradational image read by a scanner in such a manner that each objective pixel is judged by reference to 4 neighboring pixels existing above, below, left and right from the objective pixel and is judged by reference to neighboring pixels existing in above left, above right, below left and below right of the objective pixel, and each line of pixels is then judged by comparison the number of temporarily decided halftone area pixels with the number of temporarily decided character area pixels. This feature of the present invention eliminates the possibility of misdecision of pixel areas, thus preventing the occurrence of Moires in the halftone dot image.

What is claimed is:

1. An image processing device comprising:
   area deciding means for judging a pixel to be of a character image area or a halftone image area by sequentially checking multi-gradational image data pixel by pixel;
   character-binarizing means for binarizing character image areas;
   photograph-binarizing means for binarizing halftone image areas; and
   output means for selectably outputting binarized data for character or binarized data for halftone according to the area decision results,
   wherein the area deciding means for judging a pixel to be of a character image area or a halftone image area by checking multi-gradational image data pixel by pixel is further provided with
      pixel deciding means for judging an objective pixel to be of a character image area or a halftone image area by referring to pixels neighboring the objective pixel, and
      line deciding means for deciding all of the pixels arranged on a line as a halftone area in a case of the number of the pixels decided as halftone area is equal to or larger than a specified threshold or as a character area in a case of the number of the pixels decided as halftone area is less than the specified threshold.

2. The image processing device as defined in claim 1, further including a first memory for storing the multi-gradational image data.

3. The image processing device as defined in claim 2, further including a second memory for storing the binarized data.

4. The image processing device as defined in claim 1, further including a memory for storing the binarized data.

5. The image processing device as recited in claim 1, wherein the pixel deciding means for judging the objective pixel to be of a character image area or a halftone image area refers to the objective pixel and to the pixels neighboring the objective pixel.

* * * * *